US010536407B1

(12) United States Patent
Doorn et al.

(10) Patent No.: US 10,536,407 B1
(45) Date of Patent: Jan. 14, 2020

(54) CONVERTING SHARED FILES TO MESSAGE ATTACHMENTS

(71) Applicant: Amazon Technologies, Inc., Seattle, WA (US)

(72) Inventors: Ivo van Doorn, The Hague (NL); Floor Mesters, The Hague (NL); Milo Oostergo, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 967 days.

(21) Appl. No.: 14/570,919

(22) Filed: Dec. 15, 2014

(51) Int. Cl.
*H04L 12/58* (2006.01)
*G06F 3/0482* (2013.01)
*G06F 3/0484* (2013.01)
*G06Q 10/10* (2012.01)

(52) U.S. Cl.
CPC ............ *H04L 51/08* (2013.01); *G06F 3/0482* (2013.01); *G06F 3/04842* (2013.01); *G06Q 10/10* (2013.01); *G06Q 10/107* (2013.01)

(58) Field of Classification Search
CPC ..... G06F 3/048–04886; G06F 3/04842; G06F 3/0482; H04L 51/08; G06Q 10/10; G06Q 10/107
See application file for complete search history.

(56) References Cited

U.S. PATENT DOCUMENTS 8,732,853 B1 * 5/2014 Byme ................ H04L 63/0838 726/28
9,923,851 B1 * 3/2018 Sprauve ................ H04L 51/08
10,110,522 B1 * 10/2018 Mesters ................ H04L 51/046
2002/0059384 A1 * 5/2002 Kaars ................ H04L 51/08 709/206
2005/0204008 A1 * 9/2005 Shinbrood ................ H04L 51/08 709/206
2007/0143419 A1 * 6/2007 Plas ................ G06Q 10/107 709/206
2008/0016160 A1 * 1/2008 Walter ................ G06Q 10/107 709/206
2008/0120382 A1 * 5/2008 Heidloff ................ G06Q 10/107 709/206
2010/0011077 A1 * 1/2010 Shkolnikov ................ H04L 51/063 709/206
2010/0082713 A1 * 4/2010 Frid-Nielsen ................ H04L 51/08 707/821
2012/0278404 A1 * 11/2012 Meisels ................ G06Q 10/107 709/206

(Continued)

*Primary Examiner* — Amy M Levy
(74) *Attorney, Agent, or Firm* — Lee & Hayes, P.C.

(57) ABSTRACT

Functionality is disclosed herein for converting shared files to message attachments. A message interface is displayed that allows a user to compose an electronic message and to specify files to attachments. For example, a user may use a messaging client to specify the files to be converted to an attachment. The files that are specified to be attached to the electronic message are stored by a sharing service that is separate from the messaging service. Instead of downloading the specified files to the messaging client, the sharing service communicates the specified files directly to the messaging service. In this way, the amount of data downloaded to the messaging client associated with the computing device is reduced. When the user sends the message, the messaging client sends the message with the attachments to one or more recipients.

20 Claims, 10 Drawing Sheets

(56) References Cited

U.S. PATENT DOCUMENTS

2012/0278405 A1* 11/2012 Costenaro ........... H04L 67/2857
709/206
2012/0278407 A1* 11/2012 Meisels ................... H04L 51/08
709/206
2013/0346522 A1* 12/2013 Lennstrom .............. H04L 51/14
709/206
2014/0359021 A1* 12/2014 Cudak ..................... H04L 51/08
709/206
2015/0095430 A1* 4/2015 Kaushik .................. G06F 16/20
709/206
2015/0106877 A1* 4/2015 Meyers ................... H04L 51/34
726/3
2015/0134751 A1* 5/2015 Meyers, Jr. ............. H04L 51/08
709/206
2016/0026776 A1* 1/2016 Hurst .................... G06F 21/602
713/165
2016/0094499 A1* 3/2016 Uraizee ................. G06F 16/168
715/752

* cited by examiner

CONVERTING SHARED FILES TO MESSAGE ATTACHMENTS

BACKGROUND

Many businesses and users depend on electronic mail ("email") for communication. These different users may rely on email to send messages and share files. A user might receive between twenty-five and two hundred emails a day and send between ten and eighty emails a day. In some cases, the user will add attachments to the emails before sending to another user. Some of these attachments may be relatively small in size (e.g., less than 1 MB) whereas other attachments may be relatively large (e.g., greater than 5 MB).

Managing all of this data can be very challenging both for the user and for the businesses. In the case of the user, controlling who has access to an attachment can be difficult and time consuming. For example, a user might encrypt emails or password protect attachments intended for particular recipients. Businesses, on the other hand, may be attempting to manage all of this data and the email service on their own premises ("on-premise"). For example, a business may deploy servers on-premise to provide the email service. Providing an on-promise email service, however, can be costly, not only due to upkeep of the computers but also in administrators to manage the email service.

DETAILED DESCRIPTION

Figure 1:
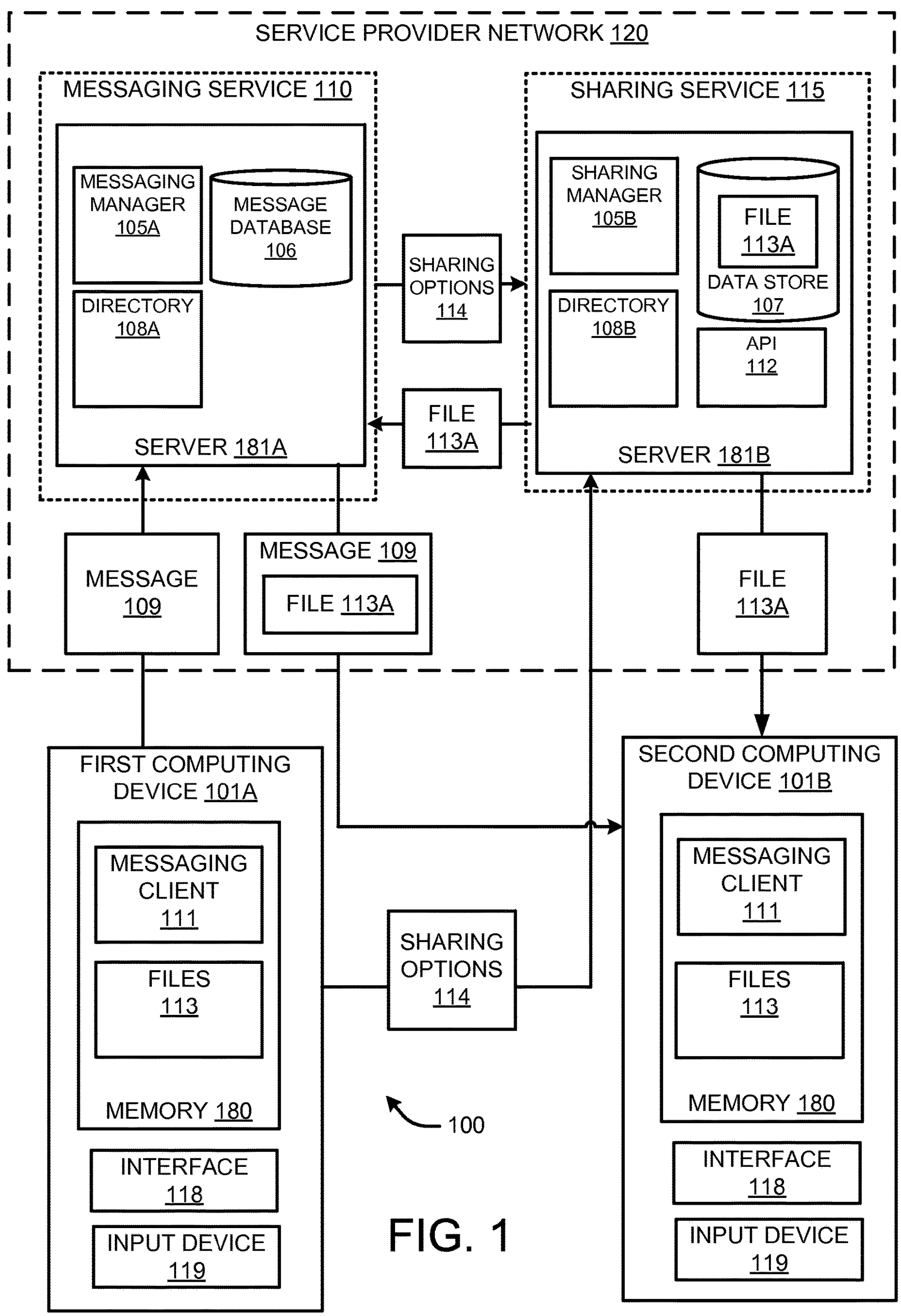
FIG. 1 is a block diagram depicting an illustrative framework in which files accessible through a sharing service may be attached to a message using a messaging client.

The following detailed description is directed to technologies for converting shared files to message attachments.

Utilizing the technologies described herein, a user may select one or more shared files to convert to attachments while composing or otherwise interacting with an electronic message. For example, a user may utilize a messaging client to specify the files stored by a sharing service to be attached to the electronic message. In some configurations, the sharing service is separate from the messaging service. The sharing service may provide access to the shared files based on sharing options that may be set during composition of the electronic message or at some other time. For instance, the sharing service may restrict or allow access to a file based on specified access settings. The sharing service can also be referred to as a "collaboration service," since at least some embodiments of the sharing service can allow users to work together on a document. For example, users can exchange different versions of a document, while providing comments on the document.

The messaging client associated with the messaging service might display a user interface ("UI") that may be utilized by the user to specify the files to convert to attachments. According to some configurations, the UI includes one or more "convert shared files to attachment" options that may be used to specify the shared files to convert to message attachments. For example, the user might access a hyperlink ("link"), a menu, or utilize some other interface (e.g., speech) to specify the shared files to convert to a message attachment. All or a portion of the shared files associated with an electronic message might be converted to message attachments.

According to some configurations, sharing permissions associated with the specified shared files to convert may be used to determine whether the specified files may be converted to message attachments. For example, a user attempting to convert a shared file to an attachment may be authorized to view a shared file using the sharing service but may not be authorized to download the file from the sharing service or share the file with other users. When the user is not authorized to download the shared file, the messaging client may prevent the shared file from being converted to a message attachment.

Instead of downloading the specified files to the messaging client when converting the shared files to message attachments, the shared files may be communicated directly from the sharing service to the messaging service (e.g., without first being stored on the computing device associated with the messaging client). In this way, the amount of data downloaded to the messaging client may be reduced. For example, when a user utilizes a messaging client on a mobile computing device, the messaging client may cause the shared files to be communicated from the sharing service to the messaging service that is implemented by one or more other computing devices without downloading the shared files to the mobile computing device.

According to some configurations, the messaging client utilizes one or more network application programming interfaces ("APIs") to communicate with the sharing service and the messaging service. In some cases, the messaging client might utilize the APIs to instruct the sharing service to transmit the shared files to be converted to message attachments directly from the sharing service to the messaging service. In other cases, the messaging client might utilize the APIs to instruct the messaging service to request the specified files from the sharing service.

When the user sends the message, the messaging service sends the message with the shared files as attachments to one or more recipients. In other configurations, the messaging service may instruct the sharing service to communicate the attachments to a messaging client on the recipient computing device. Additional details regarding the various components and processes described above for converting shared files to message attachments will be presented below with regard to FIGS. 1-10.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a block diagram depicting an illustrative framework 100 in which files accessible through a sharing service (e.g., "shared files") may be attached to a message using a messaging client. In some configurations, the framework 100 includes a messaging service 110 and a separate sharing service 115. In other configurations, a single service or more than two services might be utilized to provide the functionality described herein as being provided by the messaging service 110 and/or the sharing service 115. The messaging service 110 and the sharing service 115 may respectively manage the communication, sharing, and storage of messages and files between computing devices, such as a first computing device 101A and a second computing device 101B (also referred to herein generically and collectively as "computing devices 101").

For illustrative purposes, two computing devices 101 are shown in FIG. 1. Fewer or more computing devices 101 might be used in other implementations of the described techniques. According to some configurations, the messaging service 110, the sharing service 115 and the computing devices 101 are interconnected through one or more local and/or wide area networks (not shown).

The functionality described herein may be provided by a service provider operated network-based distributed computing environment (which may be referred to herein as a "service provider network" 120). In some configurations, the messaging service 110 and/or the sharing service 115 may be implemented within the service provider network 120.

As described in more detail below, the service provider network 120 may include a collection of rapidly provisioned and, potentially, released computing resources. The computing resources may include a number of computing, networking and storage devices in communication with one another. In some configurations, the computing resources may correspond to physical computing devices. In other configurations, the computing resources may correspond to virtual machine instances implemented by one or more physical computing devices. In still other configurations, computing resources may correspond to both virtual machine instances and physical computing devices. The operator of the service provider network 120 may charge for the use of computing resources.

In some configurations, the messaging service 110 may be provided by one or more computing devices, such as server computing devices, or some other computing device or devices configured to perform the techniques described herein. For illustrative purposes, configurations of the messaging service 110 may include a server 181A storing a messaging manager 105A, a message database 106 and a directory 108A. As will be described in more detail below, the messaging manager 105A may access permission data stored in the directory 108A for controlling user access to messages and other data stored in the message database 106. The messaging manager 105A may be configured to manage the communication of messages 109 between one or more computing devices 101.

The sharing service 115 may be provided by one or more computing devices, such as server computing devices, or some other computing device or devices configured to perform the techniques described herein. For illustrative purposes, configurations of the sharing service 115 may include a server 181B storing a sharing manager 105B, a file data store 107 and a directory 108B. As will be described in more detail below, the sharing manager 105B may access permission data stored in the directory 108B for controlling user access to files and other data stored in the file data store 107. For illustrative purposes, the directory 108A of the messaging service 110 and the directory 108B of the sharing service 115 may be referred to herein collectively and generically as a "directory 108" or "directories 108.

The sharing manager 105B may also be configured to manage the communication of data associated with the files 113 between one or more computing devices 101. In addition, and as described in more detail below, the messaging service 110 and the sharing service 115 may coordinate through one or more communication interfaces to manage the communication of messages 109 and files 113 via a message client interface.

The computing devices 101 may each include memory 180 storing a messaging client 111 and files 113. The computing devices 101 may also include a display interface 118 and an input device 119. The messaging client 111 may be configured to communicate with the messaging service 110 to receive, compose and send messages 109. In some examples, the messaging client 111 of each computing device 101 may be configured to instruct the sharing service 115 to store one or more files, such as one or more of the files 113. The messaging client 111 may be in the form of a stand-alone application, or any other application or software module having features that interact with a user the messaging service 110 and the sharing service 115 via one or more devices, such as the input device 119 and the display interface 118. The input device 119 may be any device, such as a keyboard, and/or the display interface 118, which may include a touch-enabled screen configured to receive gestures from one or more users.

In some examples, the messaging service 110 and/or the messaging client 111 may cause the display of a message interface on the first computing device 101A. The message interface may include an editable text field and controls for associating a file (e.g. file 113A stored by the sharing service 115) with a message 109. In particular, a user may select one or more files stored by the sharing service 115 and associate the selected files with the message 109 to be shared with one or more users. Upon receiving the selection of the one or more files, the sharing service 115 may configure the selected files (e.g., file 113A) for sharing.

In some examples, when a file 113 to be shared is not stored by the sharing service 115, the first computing device 101A may transmit the file 113 for storage in the file data store 107 associated with the sharing service 115. In other examples, when the file 113 is already stored by the sharing service 115, the first computing device 101A may transmit information associated with the selected files 113 to the sharing service 115. For instance, the first computing device 101A might receive and transmit sharing options 114 to the sharing service. The sharing options 114 may relate to access settings, feedback settings and expiration settings that are associated with the sharing of the selected files 113 with one or more users.

In some configurations, the messaging service 110 and/or the messaging client 111 generate one or more hyperlinks ("links") that can be utilized to access the selected files stored by the sharing service 115. The messaging service 110 and/or the messaging client 111 may integrate the generated link into the message 109 without user interaction. The message 109 including the link might be communicated from the first computing device 101A to the second computing device 101B. The message 109 and the link may be displayed on the interface 118 of the second computing device 101B. In some examples, the link to a shared file, such as file 113A, may be displayed within the message 109 as the message 109 is being composed.

According to some configurations, the sharing service 115 exposes one or more network application programming interfaces ("APIs"), such as the API 112. The API 112 can be accessed by various devices in communication with the sharing service 115 to access functionality for setting the sharing options 114 using the messaging client 111 and/or for converting shared files, such as the file 113A, to message attachments as described herein. The API 112 may be configured to support various protocols for various devices.

The techniques described herein enable users to associate one or more selected files 113 with a message 109 that are to be shared with one or more other users from a single message client interface. By providing a message client interface with one or more controls that enable to a user to share a file 113 stored by a service, such as the sharing service 115, users can share files with recipients of the message 109 without the need to switch to another application interface.

In some configurations, a user may specify the users that can access one or more shared files 113 while composing an electronic message, such as the message 109. For example, a user may use the messaging client 111 to specify the files to be shared that are stored by the sharing service 115 as well as to set the permissions required to access the shared files, such as the file 113A. In some configurations, the files 113 that are specified to be shared by the user while composing the message 109 are stored by the sharing service 115 that is separate from the messaging service 105. The sharing service 115 may provide access to files 113 stored by the sharing service, such as in the file data store 107, to users based on the access settings specified by the sharing options 114. For instance, the sharing service 115 may restrict access or allow access to the file 113 to a user based on the access settings (e.g., the permissions) associated with the file 113.

As discussed briefly above, the messaging client 111 might display an interface, such as a user interface ("UI") that may be utilized by the user composing the message 109 to set the sharing options 114. In other configurations, the messaging client might receive the sharing options 114 using some other mechanism. For example, the messaging client 111 might be configured to receive voice data that specifies the sharing options 114. According to some configurations, the sharing options 114 include access settings, feedback settings, and expiration settings. The access settings may be used to specify the users that may access the file 113 specified to be shared in the message. For example, the access settings might include an option to allow only specified recipients of the electronic message 109 to access the shared files 113 specified by the message 109 and accessible using the sharing service 115. The feedback settings associated with the file 113 may be used to specify whether feedback is desired for the shared file 113 as well as a time period within which the feedback is desired. The expiration settings may be used to specify whether access to the shared files is to expire. For example, the UI might display one or more settings that indicate that no expiration is to be associated with the sharing of the files 113 or that sharing of the files 113 should expire at a specified time.

The sharing options specified by the user composing the message 109 may be communicated from the messaging client 111 to the sharing service 115. According to some configurations, the messaging client 111 utilizes one or more network APIs, such as the API 112 exposed by the sharing service 115 to communicate the sharing options 115 that include the access settings, the feedback settings, and the expiration settings to the sharing service 115. In some cases, the messaging client 111 might utilize the API 112 to transmit the sharing options 114 directly to the sharing service 115. In other cases, the messaging client 111 might utilize the API 112 to transmit the sharing options 114 to the messaging service 110 that transmits the sharing options 114 to the sharing service 115. The sharing service 115 may manage the sharing of the specified files 113 using the received sharing options.

As discussed briefly above, a user composing the message 109 might also convert one or more of the specified files to share via the sharing service to attachments to the message 109. For example, a user may select one or more shared files to convert to attachments while composing the message 109. For example, a user may use the messaging client 111 to specify the files stored by a sharing service to be attached to the electronic message, such that the recipient receives the electronic message 109 with the shared files (e.g. file 113A) as an attachment to the message (e.g., the data for the file 113A is part of the message 109).

As illustrated in FIGS. 3-6 and described in more detail below, the messaging client 111 might display a UI that may be utilized by the user to specify the files 113 to convert to attachments. According to some configurations, the UI includes one or more "convert shared files to attachment" options that may be used to specify the files to covert to message attachments. For example, the user might access a link, a menu, or utilize some other interface (e.g., speech) to specify the files to convert to a message attachment. All or a portion of the shared files that are associated with the message 109 might be converted to message attachments.

According to some configurations, sharing permissions associated with the specified files to attach to the message may be used to determine whether the specified files may be converted to message attachments. For example, a user attempting to convert the shared file 113A to an attachment may be authorized by the sharing service 115 to view the shared file 113A but may not be authorized to download the file 113A or share the file 113A with other users. When the user is not authorized to download the file 113A, the messaging client 111 may prevent the file 113A from being converted to a message attachment and an error message may be displayed within the UI.

Instead of downloading the specified files, such as the file 113A, to the computing device 101A associated with the messaging client 111, the sharing service 115 may communicate the specified file 113A directly to the messaging service 110 (e.g., without first being stored on the computing device 101A associated with the messaging client 111). In this way, the amount of data downloaded to the computing device 101A may be reduced.

As discussed briefly above, the messaging client 111 utilizes one or more APIs to communicate with the sharing service 115 and the messaging service 110. In some configurations, the messaging client 111 might utilize the APIs to instruct the sharing service 115 to transmit the shared files to be converted to message attachments directly from the sharing 115 service to the messaging service 110. In other cases, the messaging client 111 might utilize the APIs to instruct the messaging service 110 to request the specified files from the sharing service 115.

When the user sends the message, the messaging service 110 sends the message 109 with the attachment of the file 113A to one or more recipients. In other configurations, the messaging service 110 may instruct the sharing service 115 to communicate the attachments to a messaging client 111 on the recipient computing device 101B. More details on converting shared files to message attachments are provided below.

Figure 2A:
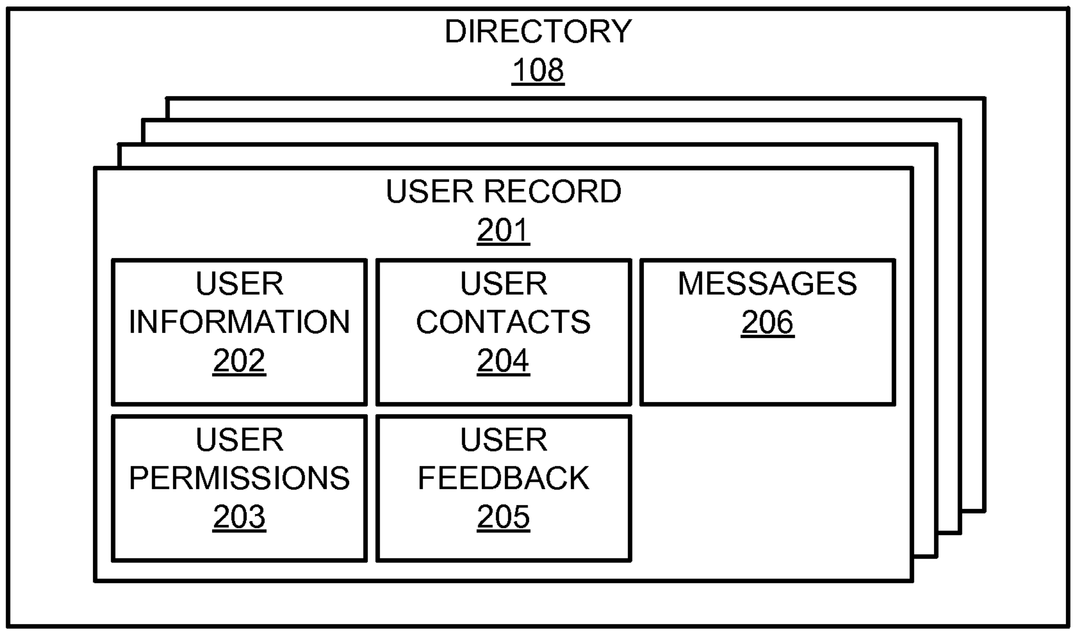
FIG. 2A is a block diagram depicting a directory.
Figure 2B:
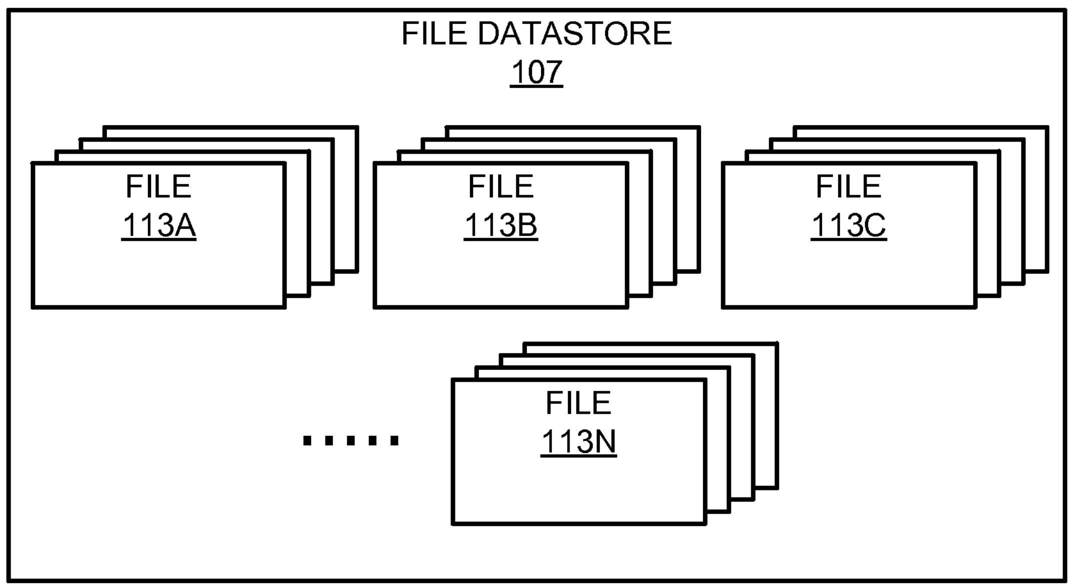
FIG. 2B is a block diagram depicting a file data store.

FIG. 2A is a block diagram depicting a directory 108 and FIG. 2B is a block diagram depicting the file data store 107 that might be utilized by the messaging service 110 and/or the sharing service 115. In some configurations, the directory 108 illustrated in FIG. 2A may include a number of records for defining access rights (e.g., as defined by the access settings specified in the sharing options 114) and permissions for users and/or identities accessing data stored by the sharing service 115 and possibly by the messaging service 110. As illustrated in FIG. 2A, an individual user record 201 may include the storage and/or association with different types of data, including, but not limited to user information 202, user permissions 203, user contacts 204, and user feedback 205. In some configurations, the user information 202 may store general identification information such as a user's name, email address, phone number and other contact information.

The user permissions 203 may contain one or more data structures for defining access rights to individual records, emails or files or other data. According to some examples, data defining access rights may be based on a per user and per record basis. Thus, individual files, directories, emails, feedback comments or other data may be controlled by the user permissions 203. The user contacts 204 may include a list of email addresses, phone numbers and identification information for other users. In some configurations, the user record 201 may include user feedback 205, which as will be described in more detail below, may include comments, notes and other data associated with files 113 stored in the file data store 107.

In some configurations, the directory 108 may include more or fewer types of data. In addition, for the sharing service 115, the directory 108 may contain a subset of the data types shown in the example of FIG. 2A. For instance, the directory 108B of the sharing service 115 may only include and/or utilize the user information 202 and user permissions 203.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as the user feedback 205. In such configurations, the user feedback 205 may be stored in the files, or in other data fields.

Turning now to FIGS. 3-6, different examples of graphical user interfaces are illustrated as screen diagrams that display information relating to converting files accessible through a sharing service to message attachments from within a messaging client. The screen diagrams presented are for illustrative purposes only, and are not intended to be limiting. For example, other visual interface as well as non-visual interfaces (e.g., voice, touch) might be utilized to perform the functionality described herein.

Figure 3:
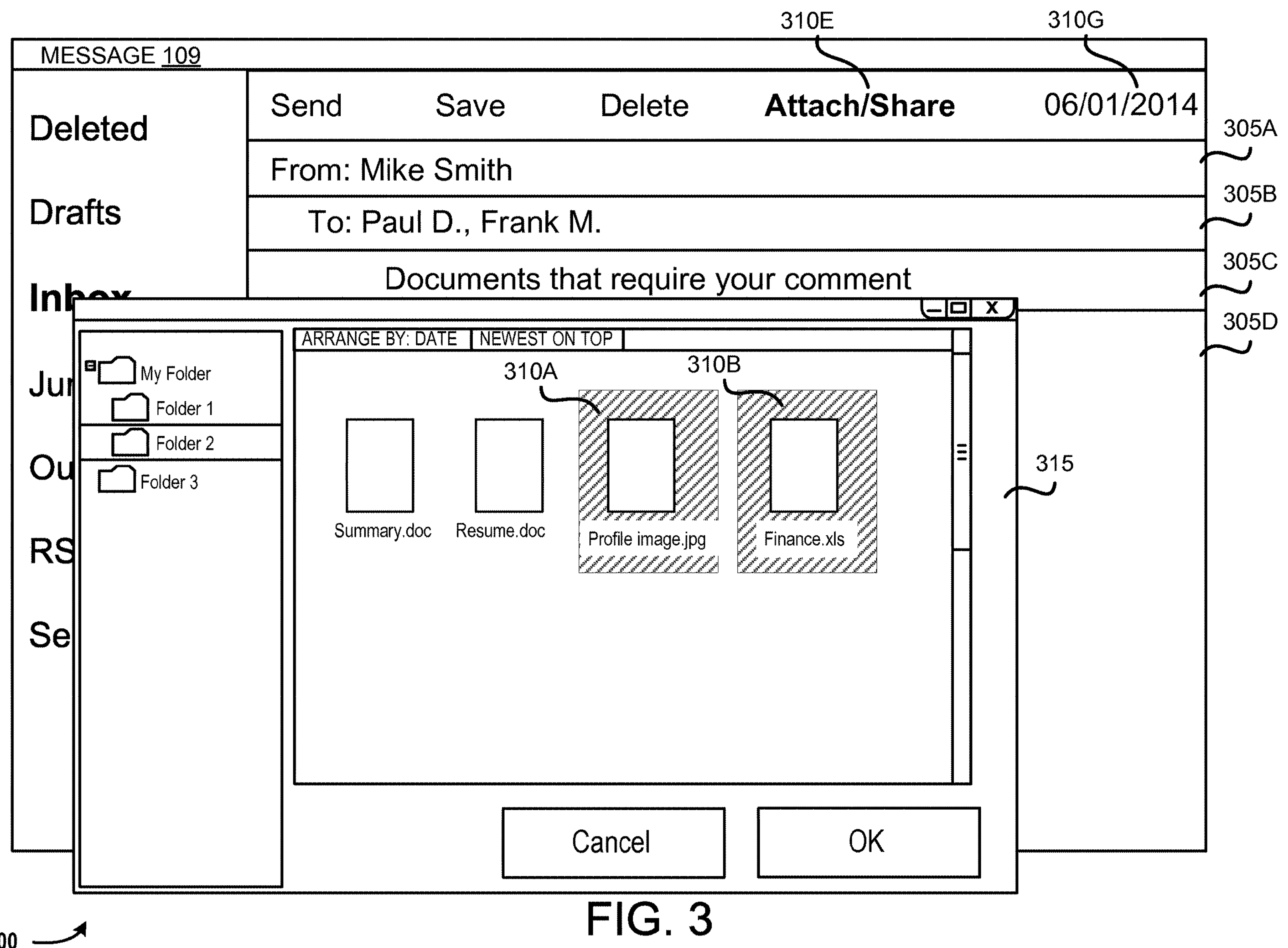
FIG. 3 is a screen diagram showing an illustrative graphical UI that displays data relating to selecting one or more files to associate with a message.

FIG. 3 is a screen diagram showing an illustrative graphical UI 300 that displays data relating to selecting one or more files to associate with a message 109. The UI 300 may be generated by the messaging client 111, shown in FIG. 1, and presented on a computing device, such as the computing device 101A or 101B by an application, such as a web browser application.

As illustrated in FIG. 3, the UI 300 includes a display of the message 109 being composed. In the current example, the message 109 includes a "from" UI element 305A showing the sender of the message 109, a "recipient" UI element 305B for specifying the recipients of the message 109, a "subject" UI element 305C for specifying the subject of the message 109, message area UI element 305D for entering text of the message 109, and an "attach/share" UI element 310E for specifying one or more files 113 to share.

In some examples, a user may select the attach/share UI element 310E to share one or more files 113. In other examples, the user may select the attach/share UI element 310E to select one or more files 113 to attach to the message 109 that are stored by the sharing service 115. In the current example, the file selection UI element 315 is displayed in response to the user selecting the attach/share UI element 310E. The files illustrated in the UI element 315 may be stored on a local data store or a network data store. For example, the files might be stored by the first computing device 101A, the second computing device 101B or stored by the sharing service 115.

As illustrated, the user has selected two files 113. The first file 113 selected is the "profile imagejpg" file represented by file UI element 310A. The second file 113 selected is the "finance.xls" file represented by file UI element 310B. In other examples, different UI elements or mechanisms may be used to select the files to be shared. For example, the user might drag and drop a file to a location within the message 109.

After the user has selected the files 113, the user may select the OK button. In response to selecting the OK button, the file selection UI element 315 may be closed and the message 109 displayed as illustrated in FIG. 4.

Figure 4:
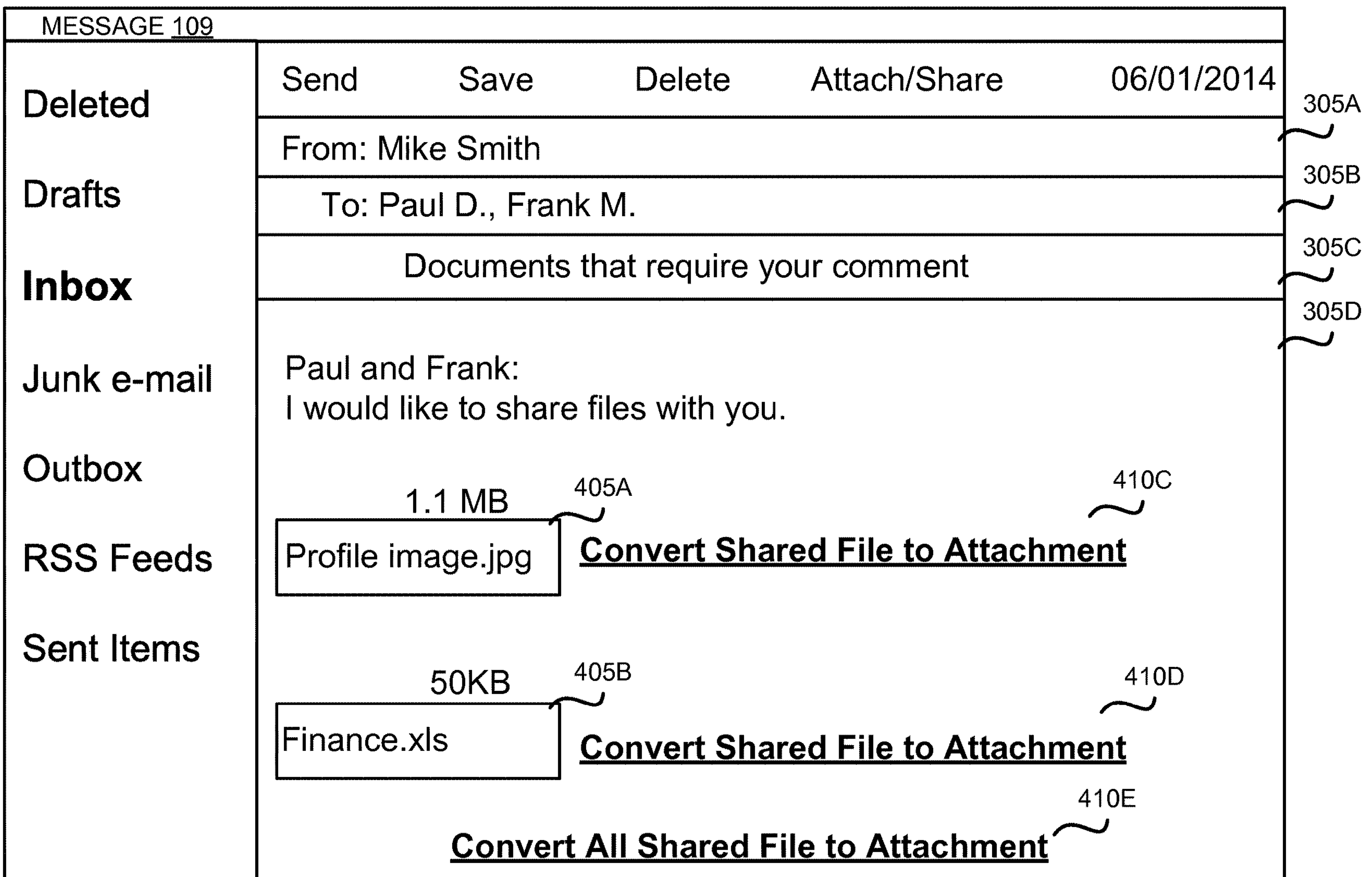
FIG. 4 is a screen diagram showing an illustrative graphical UI that displays data relating to attaching shared files to a message.

FIG. 4 is a screen diagram showing an illustrative graphical UI 400 that displays data relating to attaching shared files to the message 109. The UI 400 may be generated by the messaging client 111, shown in FIG. 1, and presented on a computing device, such as the computing device 101A or 101B by an application, such as a web browser application.

The UI 400 illustrated in FIG. 4 is similar to the UI 300 illustrated in FIG. 3. In the current example, message area UI element 305D shows a shared file UI element 405A indicating that the "profile imagejpg" file 113 is selected for sharing and the shared file UI element 405*b* indicating that the "finance.xls" file 113 is selected for sharing. As discussed herein, the UI element 405-405B might be a link to the associated file. The message area UI element 305D also displays a "convert shared file to attachment" UI element 410A to convert the "profile imagejpg" file 113 to a message attachment and a convert shared file to attachment options UI element 410B to convert the "finance.xls" file 113 to a message attachment. According to some configurations, a single UI element 410E may be selected to convert all of the shared files to attachments to the message 109.

Figure 5:
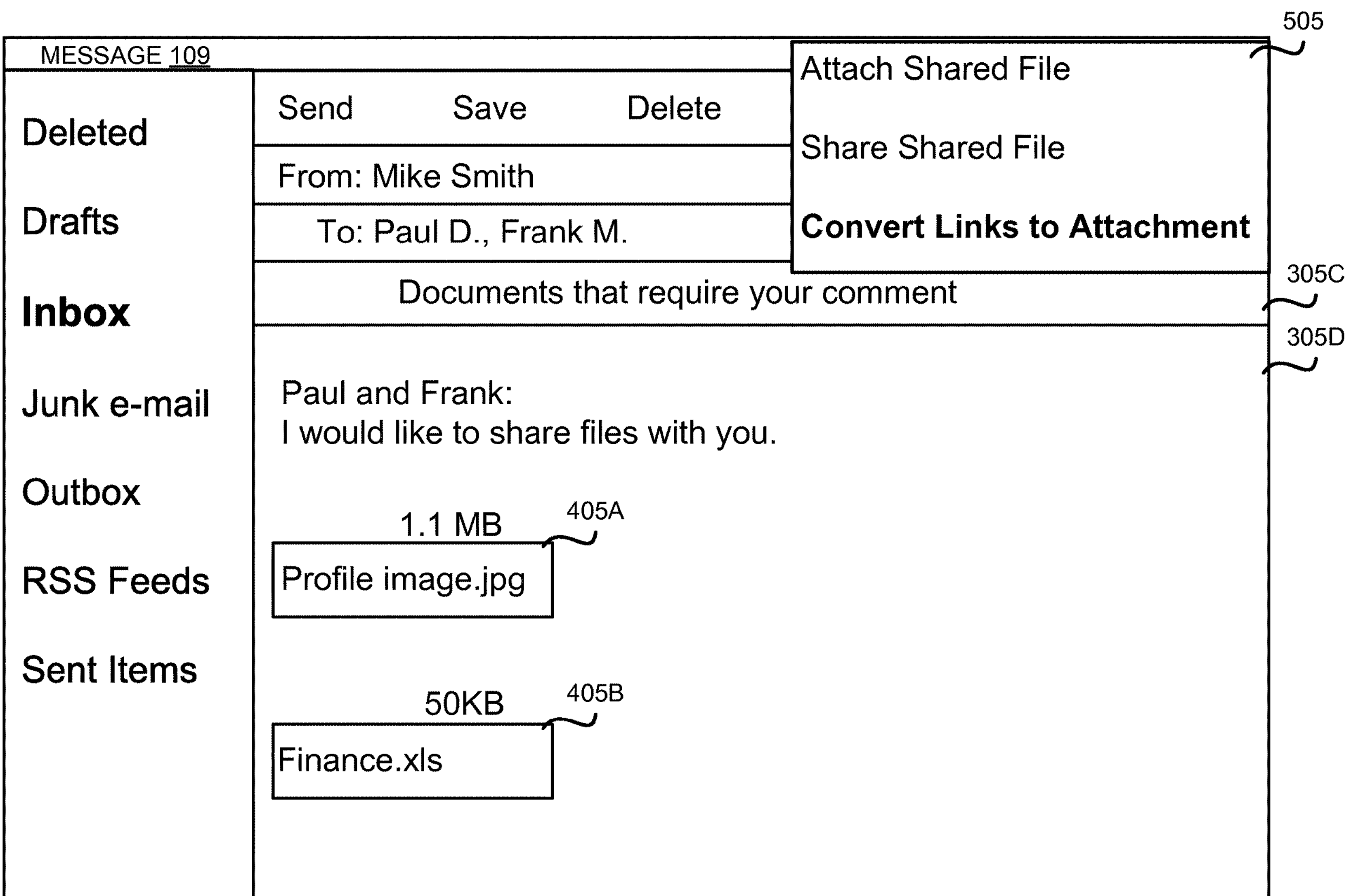
FIG. 5 is a screen diagram showing an illustrative graphical UI that displays data relating to converting shared files to attachments of the message.

FIG. 5 is a screen diagram showing an illustrative graphical UI 500 that displays data relating to converting shared files to attachments of the message 109. The UI 500 may be generated by the messaging client 111, shown in FIG. 1, and presented on a computing device, such as the computing device 101A or 101B by an application, such as a web browser application.

The UI 500 illustrated in FIG. 5 is similar to the UI 400 illustrated in FIG. 4. In the current example, UI 500 shows a UI option menu 505 that displays a "Convert Links to Attachments" option that may be selected to convert the shared files 113 that are associated with the message 109. In the current example, selecting the convert links to attachments option causes the "profile imagejpg" file 113 and the "finance.xls" file 113 to be converted to message attachments.

Figure 6:
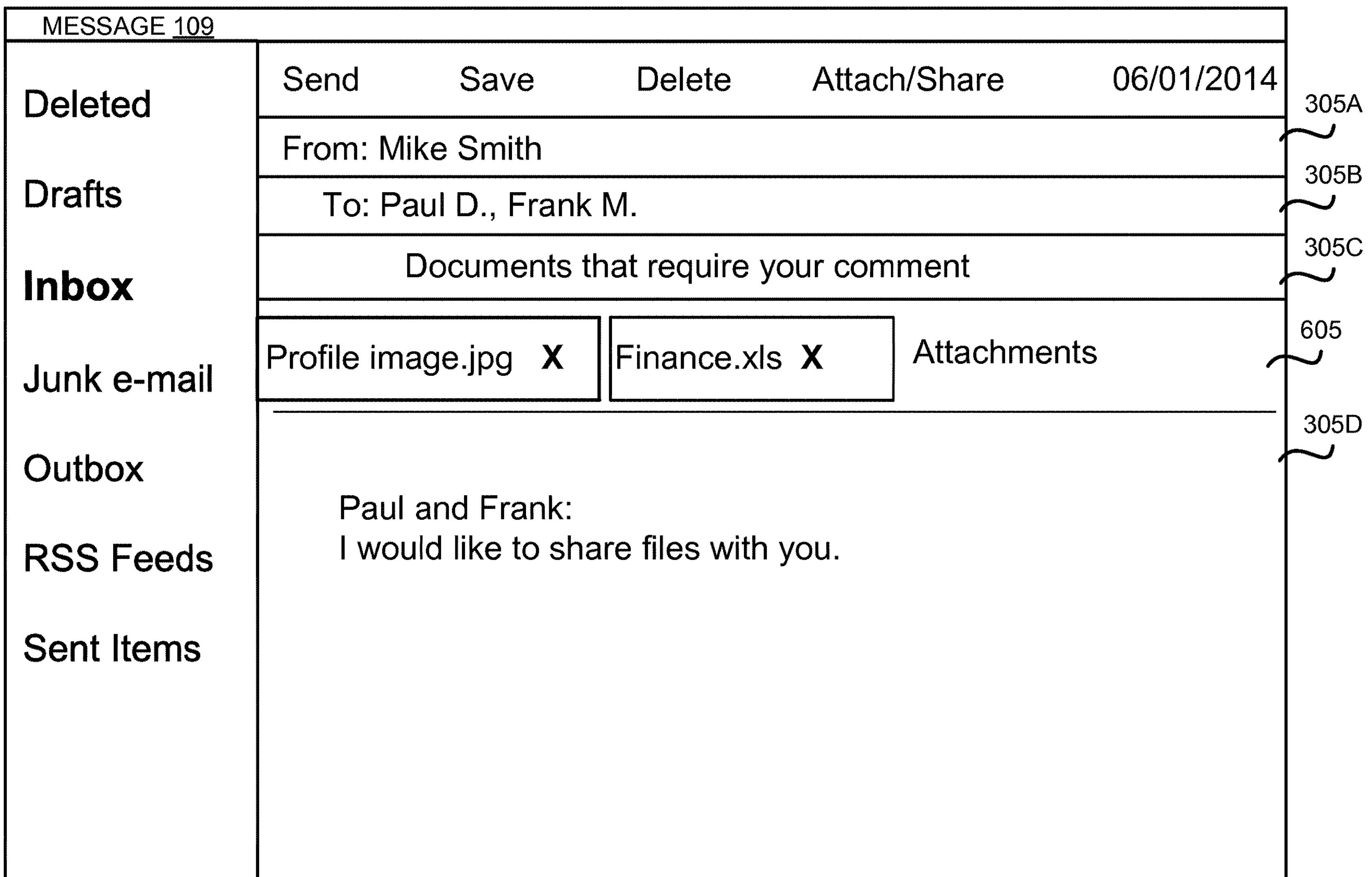
FIG. 6 is a screen diagram showing an illustrative graphical UI that displays data showing shared files added as message attachments to the message.

FIG. 6 is a screen diagram showing an illustrative graphical UI 600 that displays data showing shared files added as message attachments to the message 109. The UI 600 may be generated by the messaging client 111, shown in FIG. 1, and presented on a computing device, such as the computing device 101A or 101B by an application, such as a web browser application.

The UI 600 illustrated in FIG. 6 is similar to the UI 500 illustrated in FIG. 5. In the current example, UI 600 shows an attachment area 605 that displays the shared files that are attached to the message 109. In the current example, the attachment area 605 shows the "profile image.jpg" file 113 and the "finance.xls" file 113 as message attachments. As discussed herein, in some configurations, the files that were converted from shared files to message attachments are stored by the messaging service 110 and/or the sharing service 115 without being downloaded to the computing device 101A associated with the messaging client 111 used to specify the shared files to convert to message attachments.

Figure 7:
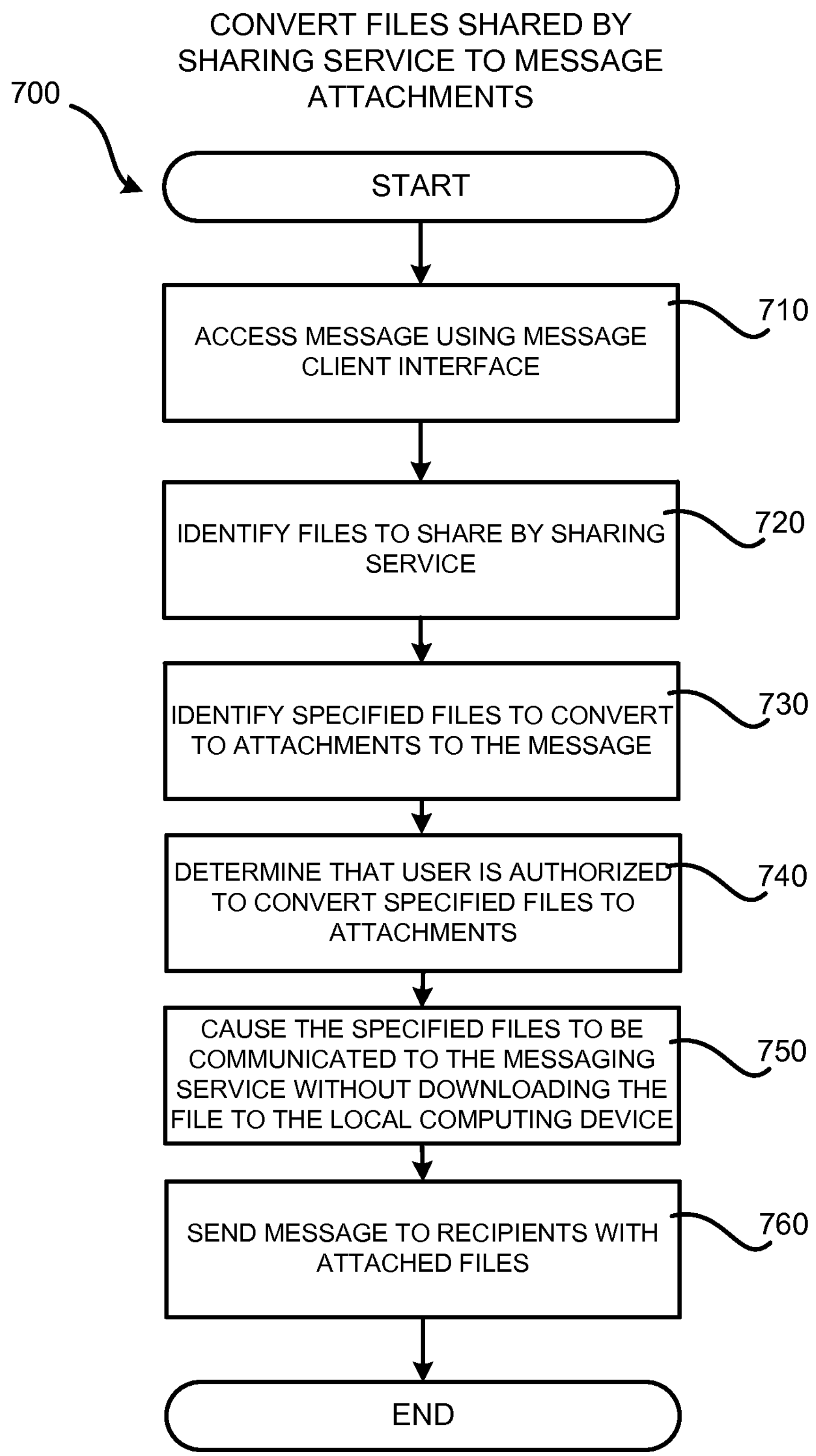
FIG. 7 is a flow diagram showing a routine that illustrates aspects of converting shared files to message attachments using a messaging client.

FIG. 7 is a flow diagram showing a routine that illustrates aspects of converting shared files to message attachments using a messaging client, according to examples disclosed herein. It should be appreciated that the logical operations described herein with respect to FIG. 7, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

The routine 700 may begin at operation 710, where an electronic message is accessed. As discussed above, the electronic message might be accessed and composed using a messaging client 111 that is associated with the messaging service 110.

From operation 710, the routine 700 may proceed to operation 720, where the files to be shared are identified. As discussed above, the user may select one or more files to be shared by the sharing service 115 with one or more users using a messaging client 111. In some configurations, the shared files 113 are selected by a user composing the message 109 and identified in the body of the electronic message 109. For example, and as discussed above, the messaging client 111 might cause a link to be displayed within the body of the message 109.

From operation 720, the routine 700 may proceed to operation 730, where files specified to be converted to message attachments are identified. As discussed above, the user might select an option in a UI, or use some other interface, to specify the files 113 to convert to message attachments. For example, a user might select the "convert file to attachment" UI element 410C presented by the messaging client 111.

From operation 730, the routine 700 may proceed to operation 740, where a determination that the user is authorized to convert the specified files may be performed. As discussed above, the sharing service 115 or the messaging service 105 may determine whether the user is authorized to download the specified files 113 based on the sharing options 114 associated with the specified files 113 to be converted to attachments.

From operation 740, the routine 700 may proceed to operation 750, where the selected files are communicated from the sharing service 115 to the messaging service 105 without downloading the selected files to the computing device 101A. As discussed above, the messaging client 111 might utilize the API 112 to instruct the sharing service 115 to transmit the selected files 113 to the messaging service 105. In other cases, the messaging client 111 might utilize the API 112 to instruct the messaging service 110 to request the specified files from the sharing service 115.

From operation 750, the routine 700 may proceed to operation 760, where the message 109 may be sent by the messaging service 110 to the recipient (e.g., the computing device 101B). The messaging service 110 includes the specified files 113 as attachments to the message 109. For example, the messaging service 110 may send an email, a text message, an SMS, or some other type of electronic message that includes the specified files 113 as attachments. The routine 700 may then proceed to an end operation.

Figure 8:
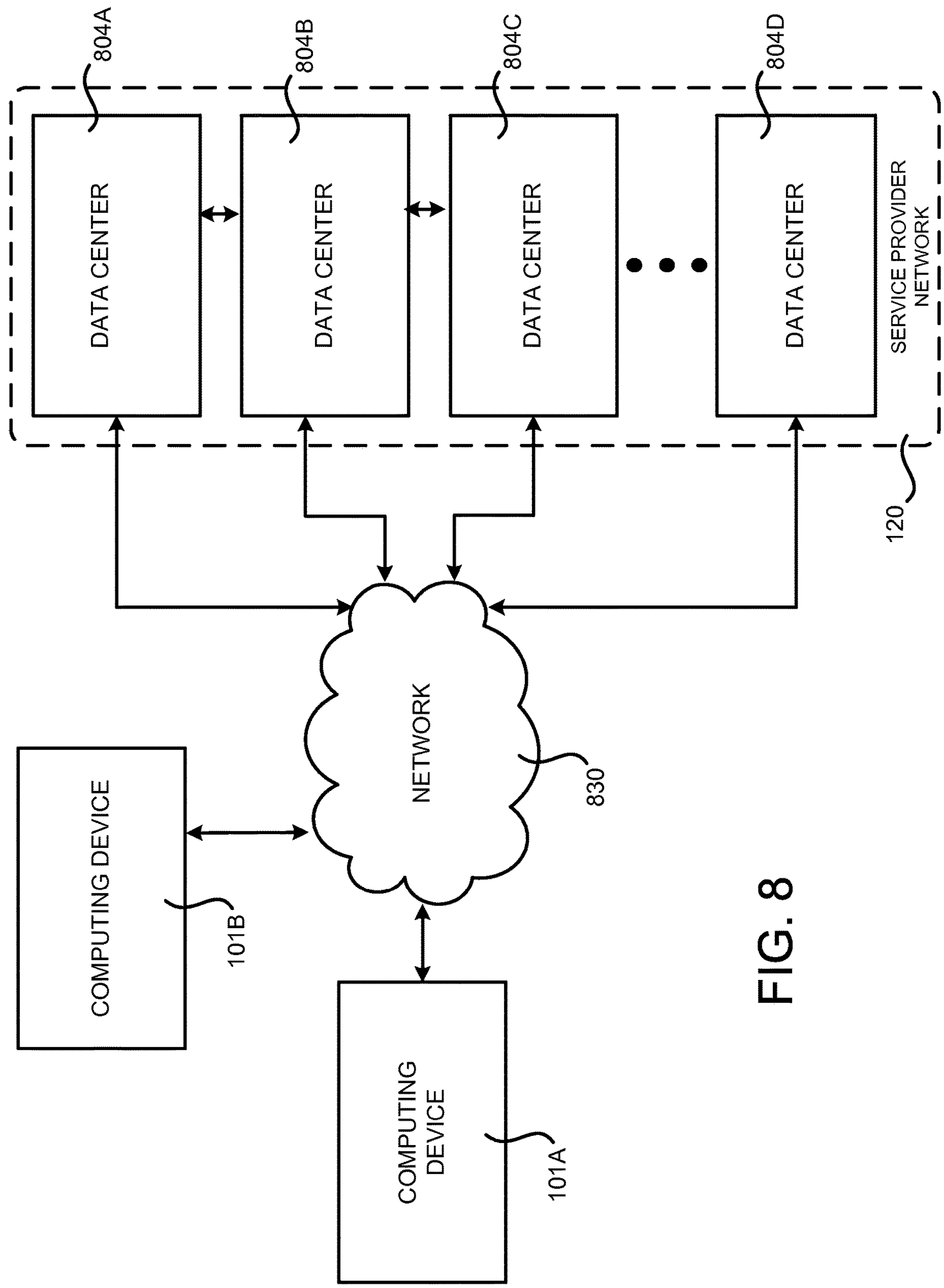
FIG. 8 is a system and network diagram that shows one illustrative operating environment for examples disclosed herein that includes a service provider network.

FIG. 8 and the following description are intended to provide a brief, general description of a suitable computing environment in which the embodiments described herein may be implemented. In particular, FIG. 8 is a system and network diagram that shows an illustrative operating environment that includes a service provider network 120. As discussed above, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 804A-804N (which may be referred to herein singularly as "a data center 804" or collectively as "the data centers 804"). The data centers 804 are facilities utilized to house and operate computer systems and associated components. The data centers 804 typically include redundant and backup power, communications, cooling and security systems. The data centers 804 might also be located in geographically disparate locations. One illustrative configuration for a data center 804 that implements some or all of the concepts and technologies disclosed herein for annotating resources in the service provider network 120 will be described below with regard to FIG. 9.

The users and customers of the service provider network 120 may access the computing resources provided by the data centers 804 over a suitable data communications network, such as a Wide Area Network ("WAN"), as illustrated by the network 830. Although a WAN might be used, it should be appreciated that a local-area network ("LAN"), the Internet, or any other networking topology known in the art that connects the data centers 804 to the computing device 101A, and the computing device 101B may be utilized. It should also be appreciated that combinations of such networks might also be utilized.

Figure 9:
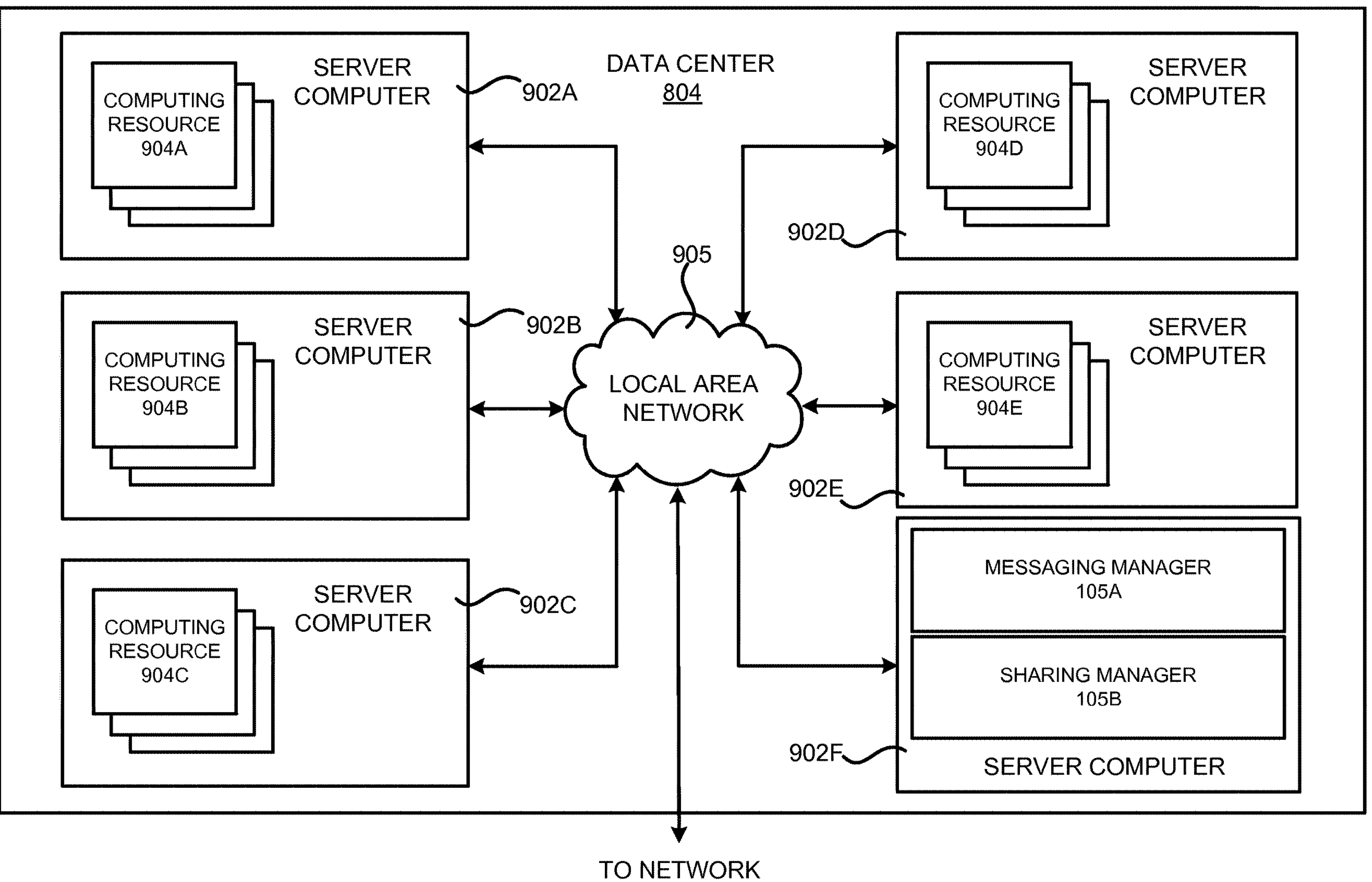
FIG. 9 is a computing system diagram that illustrates one configuration for a data center that implements aspects of a service provider network, including some or all of the concepts and technologies disclosed herein for converting shared files to message attachments using a messaging client.

FIG. 9 is a computing system diagram that illustrates one configuration for a data center 804 that implements aspects of a service provider network 120, including some or all of the concepts and technologies disclosed herein for converting shared files to message attachments using a messaging client 111. The example data center 804 shown in FIG. 9 includes several server computers 902A-902F (which may be referred to herein singularly as "a server computer 902" or in the plural as "the server computers 902") for providing computing resources. The server computers 902 may be standard tower or rack-mount server computers configured appropriately for providing the computing resources described herein. According to an embodiment, the server computers 902 are configured to execute the software products as described above.

In one example, some of the computing resources 904 are virtual machine instances. As known in the art, a virtual machine instance is an instance of a software implementation of a machine (i.e. a computer) that executes programs like a physical machine. Each of the server computers 902 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 902, for example.

It should be appreciated that although the embodiments disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 804 shown in FIG. 9 also includes a server computer 902F reserved for executing software components for managing the operation of the data center 804, server computers 902, virtual machine instances, and other resources within the service provider network 120. The server computer 902F might also execute the messaging manager 105A and/or the sharing manager 105B. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 804 shown in FIG. 9, an appropriate local area network ("LAN") 905 is utilized to interconnect the server computers 902A-902E and the server computer 902F. The LAN 905 is also connected to the network 830 illustrated in FIG. 8. It should be appreciated that the configuration and network topology illustrated in FIGS. 8 and 9 has been greatly simplified and that many more computing systems, networks and networking devices may be utilized to interconnect the various computing systems disclosed herein. Appropriate load balancing devices or software modules might also be utilized for balancing a load between each of the data centers 804A-804N, between each of the server computers 902A-902F in each data center 804 and between virtual machine instances and other types of computing resources provided by the service provider network 120.

It should be appreciated that the data center 804 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 10:
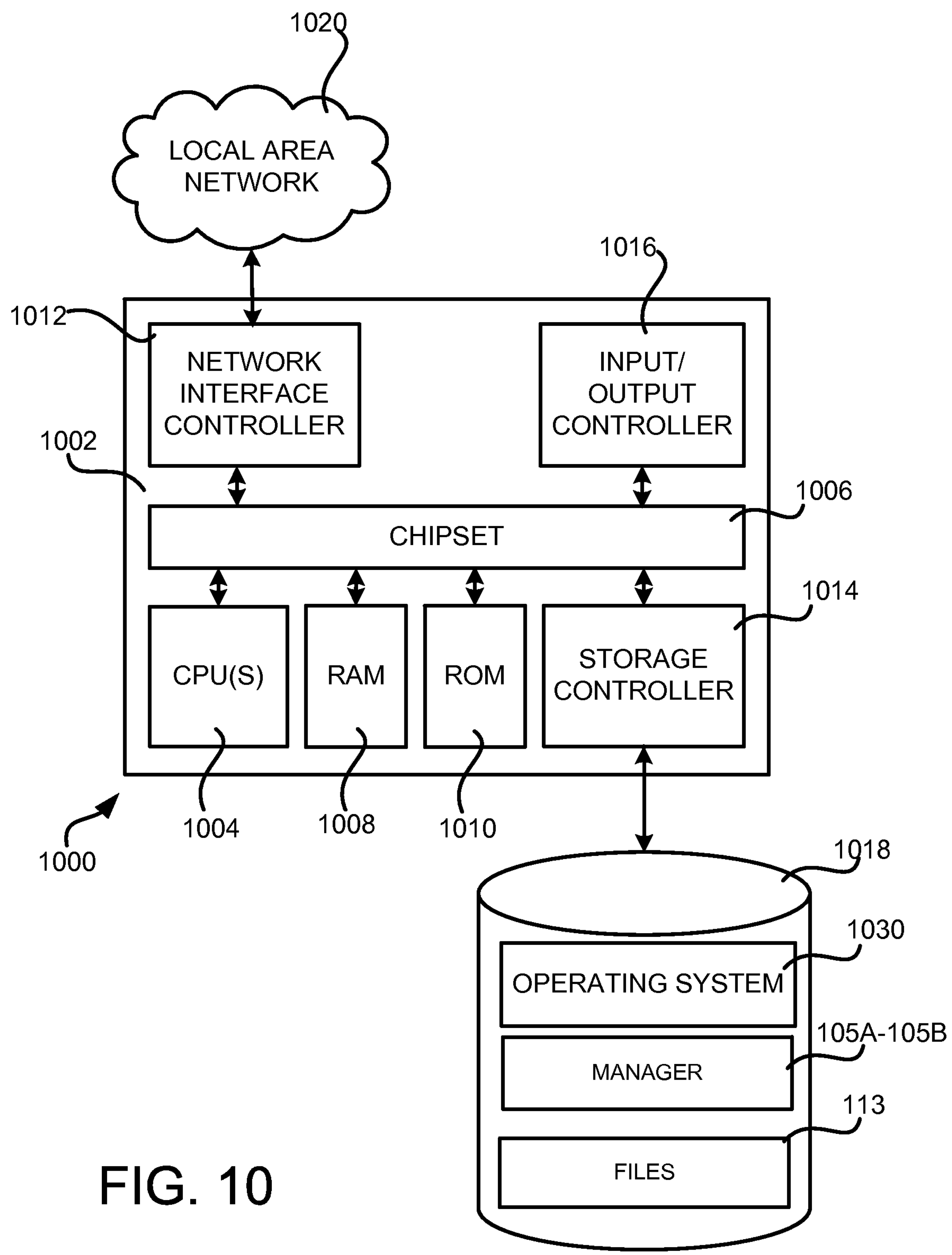
FIG. 10 is a computer architecture diagram showing an illustrative computer hardware architecture for implementing a computing device that might be utilized to implement aspects of the various embodiments presented herein.

FIG. 10 shows an example computer architecture for a computer 1000 capable of executing program components for converting shared files to message attachments using a messaging client 111 in the manner described above. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 10 may be utilized to execute software components for performing operations as described above. The computer architecture shown in FIG. 10 might also be utilized to implement a computing device 101A or 101B or any other of the computing systems described herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1006 provides an interface between the CPUs 1004 and the remainder of the components and devices on the baseboard 1002. The chipset 1006 may provide an interface to a RAM 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network, such as the local area network 1020. The chipset 1006 may include functionality for providing network connectivity through a network interface controller (NIC) 1012, such as a gigabit Ethernet adapter. The NIC 1012 is capable of connecting the computer 1000 to other computing devices over the local area network 1020. It should be appreciated that multiple NICs 1012 may be present in the computer 1000, connecting the computer to other types of networks and remote computer systems.

The computer 1000 may be connected to a mass storage device 1018 that provides non-volatile storage for the computer. The mass storage device 1018 may store system programs, application programs, other program modules and data, which have been described in greater detail herein. The mass storage device 1018 may be connected to the computer 1000 through a storage controller 1014 connected to the chipset 1006. The mass storage device 1018 may consist of one or more physical storage units. The storage controller 1014 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1018 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1018 is characterized as primary or secondary storage and the like.

For example, the computer 1000 may store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1018 by detecting the physical states or characteristics of one or more particular locations within the physical storage units.

In addition to the mass storage device 1018 described above, the computer 1000 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1018 may store an operating system 1030 utilized to control the operation of the computer 1000. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1018 may store other system or application programs and data utilized by the computer 1000, such as components that include the managers 105A-105B, the files 113, and/or any of the other software components and data described above. The mass storage device 1018 might also store other programs and data not specifically identified herein.

In one example, the mass storage device 1018 or other computer-readable storage media is encoded with computer-executable instructions which, when loaded into the computer 1000, transform the computer from a general-purpose computing system into a special-purpose computer capable of implementing the examples described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various routines described above with regard to FIG. 7. The computer 1000 might also include computer-readable storage media for performing any of the other computer-implemented operations described herein.

The computer 1000 may also include one or more input/output controllers 1016 for receiving and processing input from a number of input devices, such as a keyboard, a mouse, a touchpad, a touch screen, an electronic stylus, or other type of input device. Similarly, the input/output controller 1016 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for converting shared files to message attachments have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, perform acts to:

cause a display of a message interface associated with a message client of a messaging service, the message interface including a link to a file stored by a sharing service and one or more user interface elements utilized to configure settings that include an access setting operable to specify one or more first recipients of the electronic message that are authorized to access the file, and an expiration setting that indicates a time when access to the file expires, wherein the message interface is used by a user to compose an electronic message, wherein the sharing service is separate from the messaging service;

cause data associated with the settings to be sent from the messaging service to the sharing service;

receive a selection of an option to convert the link to an attachment of the electronic message;

receive second data indicating the one or more first recipients;

cause the file stored by the sharing service to be communicated directly to the messaging service;

update the display of the message interface to indicate that the file is attached to the electronic message, wherein the file is not locally stored by the computer; and cause the electronic message to be sent from the messaging service to the one or more first recipients and one or more second recipients, the electronic message including the file as an attachment, wherein the one or more first recipients are authorized access to the file and the one or more second recipients are restricted access to the file based on stored per user access rights.

2. The non-transitory computer-readable storage medium of claim 1, wherein update the display of the message interface to indicate that the file is attached to the electronic message comprises removing the link to the file and displaying an identifier of the file within an attachment area of the electronic message.

3. The non-transitory computer-readable storage medium of claim 1, wherein the one or more user interface elements display information that indicates the time when access to the file expires.

4. The non-transitory computer-readable storage medium of claim 1, wherein the instructions further cause the computer to determine that the user is authorized to convert the link to the attachment for the associated file.

5. The non-transitory computer-readable storage medium of claim 1, wherein cause the file stored by the sharing service to be communicated to the messaging service comprises utilizing an application programming interface to instruct the sharing service to communicate the file to the messaging service.

6. An apparatus, comprising:

at least one processor; and a non-transitory computer-readable storage medium having computer-executable instructions stored thereon which, when executed on the at least one processor, cause the apparatus to display a message interface associated with a message client of a messaging service, the message interface used to compose an electronic message, wherein the message interface includes one or more user interface elements utilized to configure at least one setting that includes an expiration setting that indicates a time when access to a file expires and an access setting operable to specify one or more first recipients of the electronic message that are authorized to access the file, cause the file stored by the sharing service, that is separate from the messaging service, to be converted to an attachment of the electronic message without locally storing the file on the apparatus, cause data associated with the at least one setting to be sent from the messaging service to the sharing service, and cause the electronic message to be sent from the messaging service to the one or more firsts recipients and one or more second recipients, the electronic message including the file as an attachment, wherein the one or more first recipients are authorized access to the file and the one or more second recipients are restricted access to the file based on stored per user access rights.

7. The apparatus of claim 6, wherein cause the file stored by the sharing service to be converted to the attachment of the electronic message comprises communicating the file directly from the sharing service to the messaging service.

8. The apparatus of claim 6, wherein display the message interface comprises displaying an indication in the message interface that the file has been shared by the sharing service.

9. The apparatus of claim 8, wherein the instructions further cause the apparatus to update the display of the message interface to remove the indication in the message interface that the file is shared and display an identifier of the file within an attachment area of the electronic message.

10. The apparatus of claim 6, wherein the instructions further cause the apparatus to display an option to convert a shared file to the attachment and determine that a user is authorized to convert the file to the attachment.

11. The apparatus of claim 6, wherein the instructions further cause the apparatus to display one or more of an access setting that indicates at least one user that is authorized to access the file that is stored by a sharing service, or a feedback setting that is associated with receiving feedback for the file.

12. The apparatus of claim 6, wherein cause the file stored by the sharing service to be converted to an attachment of the electronic message without downloading the file to the apparatus comprises causing the sharing service to communicate the file to the messaging service.

13. The apparatus of claim 12, wherein causing the sharing service to communicate the file to the messaging service comprises utilizing an application programming interface to instruct the sharing service to communicate the file to the messaging service.

14. The apparatus of claim 7, wherein the instructions further cause the apparatus to receive a selection of the file stored by the sharing service through the message interface.

15. A computer-implemented method, comprising:

causing display of a message interface associated with a message client of a messaging service, the message interface used to compose an electronic message, wherein the message interface includes one or more user interface elements utilized to configure at least one setting that includes an expiration setting that indicates a time when access to a file expires and an access setting operable to specify one or more first recipients of the electronic message that are authorized to access the file;

causing the file stored by the sharing service to be converted to the attachment of the electronic message without storing the file on a remote computing device used to compose the electronic message;

causing data associated with the at least one setting to be sent from the messaging service to the sharing service; and causing the electronic message to be sent from the messaging service to the one or more first recipients and one or more second recipients, the electronic message including the file as the attachment, wherein the one or more first recipients are authorized access to the file and the one or more second recipients are restricted access to the file based on stored per user access rights.

16. The computer-implemented method of claim 15, wherein causing the file stored by the sharing service to be converted to the attachment of the electronic message comprises communicating the file directly from the sharing service to the messaging service and storing the file at the message service.

17. The computer-implemented method of claim 15, wherein causing display of the message interface comprises causing display of a link in the message interface that is operative to access the file at the sharing service.

18. The computer-implemented method of claim 17, further comprising causing updating of the display of the message interface to remove the link in the message interface and causing display of the file as the attachment to the electronic message.

19. The computer-implemented method of claim 15, further comprising identifying the file based, at least in part, on receiving a selection of an option associated with the messaging interface.

20. The computer-implemented method of claim 15, wherein causing the file stored by the sharing service to be converted to the attachment comprises utilizing an application programming interface to instruct the sharing service to communicate the file to the messaging service.

* * * * *

UNITED STATES PATENT AND TRADEMARK OFFICE

CERTIFICATE OF CORRECTION

PATENT NO. : 10,536,407 B1
APPLICATION NO. : 14/570919
DATED : January 14, 2020
INVENTOR(S) : Ivo van Doorn et al.

It is certified that error appears in the above-identified patent and that said Letters Patent is hereby corrected as shown below:

In the Claims

Column 16, Line 61, change "messaging service to the one or more firsts recipients" to -- messaging service to the one or more first recipients --.

Signed and Sealed this
Fourteenth Day of April, 2020

Andrei Iancu
*Director of the United States Patent and Trademark Office*